United States Patent
Kim et al.

(10) Patent No.: US 8,824,348 B2
(45) Date of Patent: Sep. 2, 2014

(54) METHOD FOR CONTROLLING POWER SAVING MODE IN GROUP COMMUNICATION

(75) Inventors: Sung Kyung Kim, Daejeon (KR); Sung Cheol Chang, Daejeon (KR); Eunkyung Kim, Seoul (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 360 days.

(21) Appl. No.: 13/248,239

(22) Filed: Sep. 29, 2011

(65) Prior Publication Data

US 2012/0087287 A1 Apr. 12, 2012

(30) Foreign Application Priority Data

Sep. 29, 2010 (KR) .................. 10-2010-0094488
Sep. 29, 2011 (KR) .................. 10-2011-0099027

(51) Int. Cl.
*G08C 17/00* (2006.01)
*H04W 52/02* (2009.01)

(52) U.S. Cl.
CPC ...... *H04W 52/0219* (2013.01); *H04W 52/0216* (2013.01)
USPC ......................................................... 370/311

(58) Field of Classification Search
CPC ..................... H04W 52/0219; H04W 52/0216
USPC ......................................................... 370/311
See application file for complete search history.

(56) References Cited

U.S. PATENT DOCUMENTS

| | | | | |
|---|---|---|---|---|
| 6,449,491 | B1 * | 9/2002 | Dailey ........................ | 455/518 |
| 2005/0075148 | A1 * | 4/2005 | Park ............................ | 455/574 |
| 2006/0245425 | A1 * | 11/2006 | Mathis et al. ................ | 370/389 |
| 2007/0124440 | A1 * | 5/2007 | Maki ........................... | 709/223 |
| 2009/0168680 | A1 * | 7/2009 | Singh et al. .................. | 370/312 |
| 2010/0111066 | A1 * | 5/2010 | Mehta .......................... | 370/345 |

* cited by examiner

*Primary Examiner* — Mark Rinehart
*Assistant Examiner* — Christopher R Crompton
(74) *Attorney, Agent, or Firm* — Staas & Halsey LLP

(57) ABSTRACT

A method of controlling power saving modes of a plurality of terminals joining in a group communication by a base station is provided. The base station establishes a group call connection with the plurality of terminals, and establishes a same power saving mode pattern for the plurality of terminals.

18 Claims, 9 Drawing Sheets

METHOD FOR CONTROLLING POWER SAVING MODE IN GROUP COMMUNICATION

CROSS-REFERENCE TO RELATED APPLICATION

This application claims priority to and the benefit of Korean Patent Application Nos. 10-2010-0094488 filed in the Korean Intellectual Property Office on Sep. 29, 2010 and 10-2011-0099027 filed in the Korean Intellectual Property Office on Sep. 29, 2011, the entire contents of which are incorporated herein by reference.

BACKGROUND (a) Field

The present invention relates a method for controlling a power saving mode in a group communication.

(b) Description of the Related Art

A group communication service, in which users join in a conversation, simultaneously transmits the same downlink traffic to all the users of a group. Therefore, the group communication service can use a downlink multicast or broadcast connection as well as unicast connections. When the group communication service is used in a cellular-based wireless access system, a conventional broadcast service technology, for example a multicast broadcast service (MBS) technology or a terminal-based unicast service technology may be considered.

The conventional broadcast service supports a sleep mode for power saving of a terminal. In this case, entering or releasing the sleep mode is performed through unicast-based signaling, and a sleep cycle is controlled for each terminal.

If the conventional sleep mode is used in the group communication, unicast sleep mode signaling and unicast sleep mode control are performed for each terminal. However, when most terminals receive only the multicast-based group communication service, it is inefficient that sleep modes of the users within the group are controlled through the unicast signaling. Further, in order to quickly transit an idle mode to an active mode in the group communication, it is required to minimize a delay for transiting all the terminals within the group from a sleep state to an awake state or a normal state.

Therefore, when using the conventional sleep mode, it is required to set sleep cycles to be the same or to set listening windows to be close, for all sleep mode users within the group. However, these requirements make sleep cycles of terminals, which use other services as well as the group communication service, be restricted to the group communication service.

SUMMARY

Embodiments of the present invention provide a method for controlling a power saving mode, for efficiently saving powers of terminals joining in a group communication.

An embodiment of the present invention provides a method of controlling power saving modes of a plurality of terminals joining in a group communication by a base station. The method includes establishing a group call connection with the plurality of terminals, and establishing a same power saving mode pattern for the plurality of terminals.

The power saving mode pattern may include a power saving cycle having a listening window and a sleep window.

The power saving mode pattern may be established when the group call connection is established.

Establishing the power saving mode pattern may include transmitting messages including information on the power saving mode pattern to the plurality of terminals by unicast, respectively.

Establishing the power saving mode pattern may include transmitting a message including information on the power saving mode pattern to the plurality of terminals by multicast.

The method may further include receiving a request message for establishing a power saving mode pattern that is different from the same power saving mode pattern from a predetermined terminal of the plurality of terminals, and transmitting a response message including information on the different power saving mode pattern to the predetermined terminal. The different power saving mode pattern may be applied to the predetermined terminal.

The method may further include receiving a request message for changing the power saving mode pattern from a predetermined terminal of the plurality of terminals, and transmitting a response message including information on a changed power saving mode pattern to the plurality of terminals by multicast.

The method may further include allocating a same identifier to the plurality of terminals, for controlling power saving modes of the plurality of terminals.

The method may further include transmitting a traffic indication message to the plurality of terminals when traffic to be transmitted to the plurality of terminals exists. The traffic indication message may include the identifier.

Another embodiment of the present invention provides a method of controlling a power saving mode by a terminal joining in a group communication. The method includes establishing a group call connection with a base station, establishing a same power saving mode pattern as other terminals joining in the group communication, and entering a power saving mode according to the power saving mode pattern.

The method may further include entering the power saving mode when other service connection is released and no burst for the group call exists.

The power saving mode pattern may include a power saving cycle having a listening window and a sleep window.

The power saving mode pattern may be established when the group call connection is established.

Establishing the power saving mode pattern may include receiving a messages including information on the power saving mode pattern from the base station.

The method may further include transmitting a request message for establishing a power saving mode pattern that is different from the same power saving mode pattern, to the base station, and receiving a response message including information on the different power saving mode pattern from the base station. The terminal may operate with the different power saving mode pattern in the power saving mode.

The method may further include transmitting a request message for changing the power saving mode pattern to the base station, and receiving a response message including information on a changed power saving mode pattern from the base station.

The terminal may be a terminal with a highest priority among a plurality of terminals.

The method may further include receiving an identifier from the base station, and the identifier may be equally allocated to a plurality of terminals, for controlling power saving modes of the plurality of terminals.

The method may further include receiving a traffic indication message from the base station in a listening window of the power saving mode, and checking whether the identifier exists in the traffic indication message.

The power saving mode pattern may include a power saving cycle having a listening window and a sleep window. Entering the power saving mode may include setting a common window of a sleep window of a power saving mode for other service and the sleep window according to the power saving mode pattern as a new sleep window when the other service is released.

DETAILED DESCRIPTION OF THE EMBODIMENTS

Figure 1:
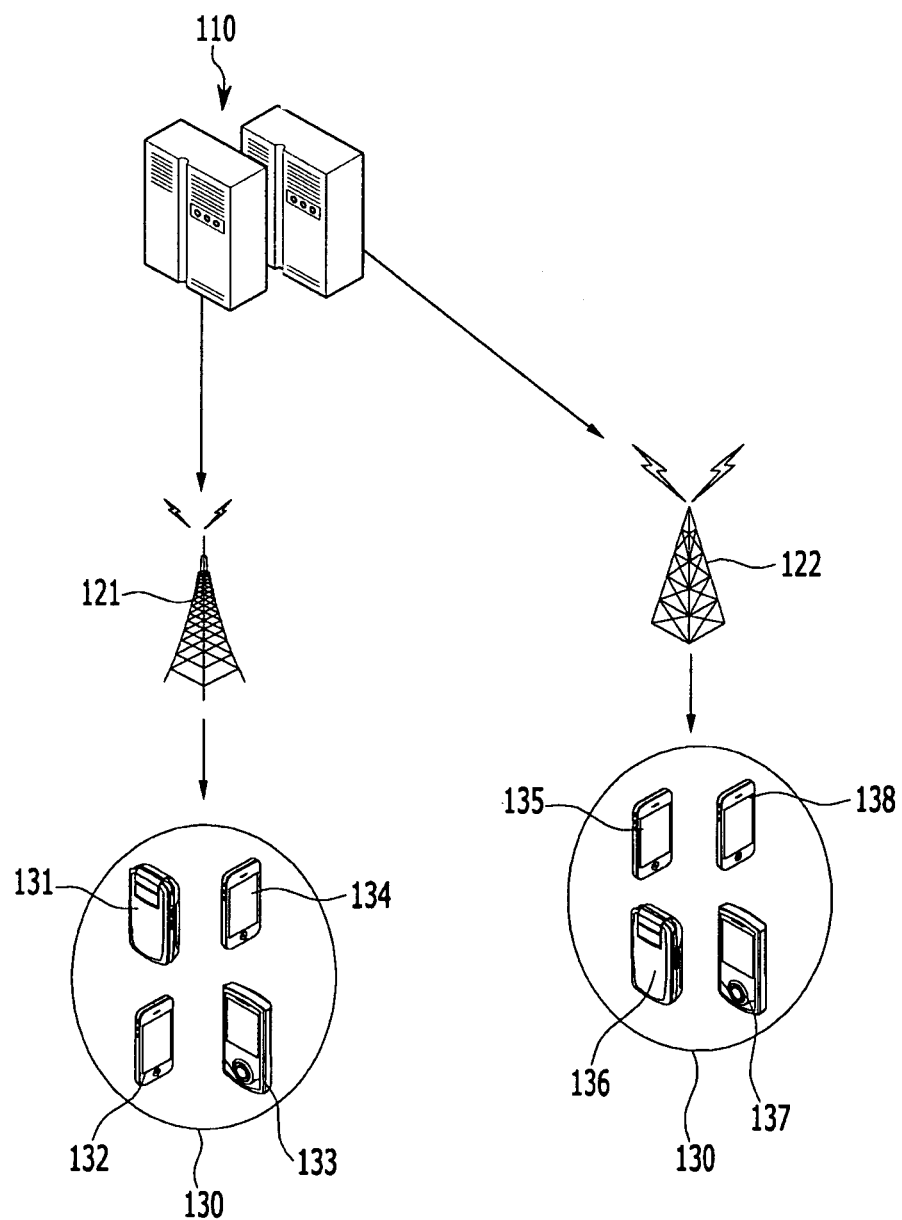
FIG. 1 is a drawing showing a group communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a high reliability relay station (HR-RS) performing the base station function and so on, or may include all or some functions thereof.

FIG. 1 is a drawing showing a group communication system according to an embodiment of the present invention.

Referring to FIG. 1, traffic is transmitted from a node 110 to at least one base station 121 and 122, for a group communication. The node may be an upper node 110 such as a group call server, for example a PTT server. The PTT server 110 may be connected to the base stations 121 and 122 via a router (not shown) and/or a control station (not shown). The base stations 121 and 122 establish a group call connection in a wireless access interval, and transmits the traffic to terminals 131 to 134 and 135 to 138, which belong to its coverage among a user group 130, by multicast.

Next, a group communication establishing method according to an embodiment of the present invention will be described with reference to FIG. 2.

Figure 2:
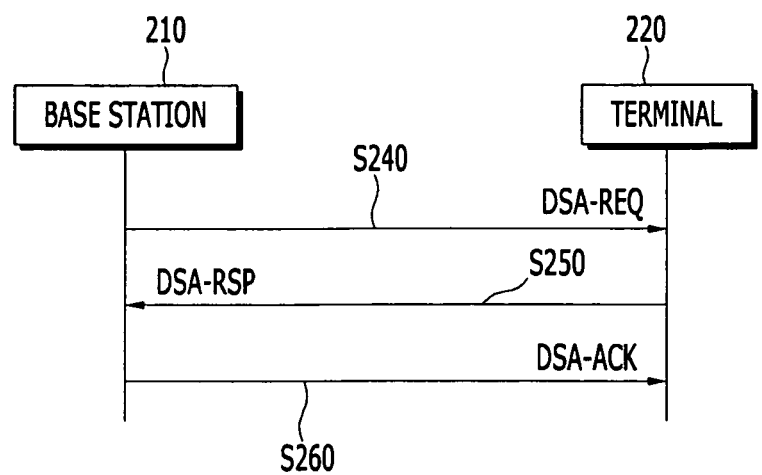
FIG. 2 is a signal flowchart showing a group communication establishing method according to an embodiment of the present invention.

FIG. 2 is a signal flowchart showing a group communication establishing method according to an embodiment of the present invention.

Referring to FIG. 2, a base station 210 establishes a group call connection for a user joining in a group communication, i.e., a plurality of terminals, using unicast transmission. The base station 210 transmits or receives signals for establishing the group call connection to or from each terminal 220 of the user group. For example, the base station 210 may establish the group call connection using dynamic service addition (DSA) transaction for establishing a flow. In the DSA transaction, the base station 210 transmits a DSA request (DSA-REQ) message to each terminal 220 of the user group (S230), and each terminal 220 transmits a DSA response (DSA-RSP) message to the base station 210 as a response of the DSA-REQ message (S240). The base station 210 transmits a DSA acknowledgement (DSA-ACK) message to each terminal 220 as an acknowledgement of the DSA-RSP message (S250).

Next, a method for controlling a power saving mode according to an embodiment of the present invention will be described with reference to FIG. 3 to FIG. 8. A sleep mode is described as an example of the power saving mode in FIG. 3 to FIG. 8.

Figure 3:
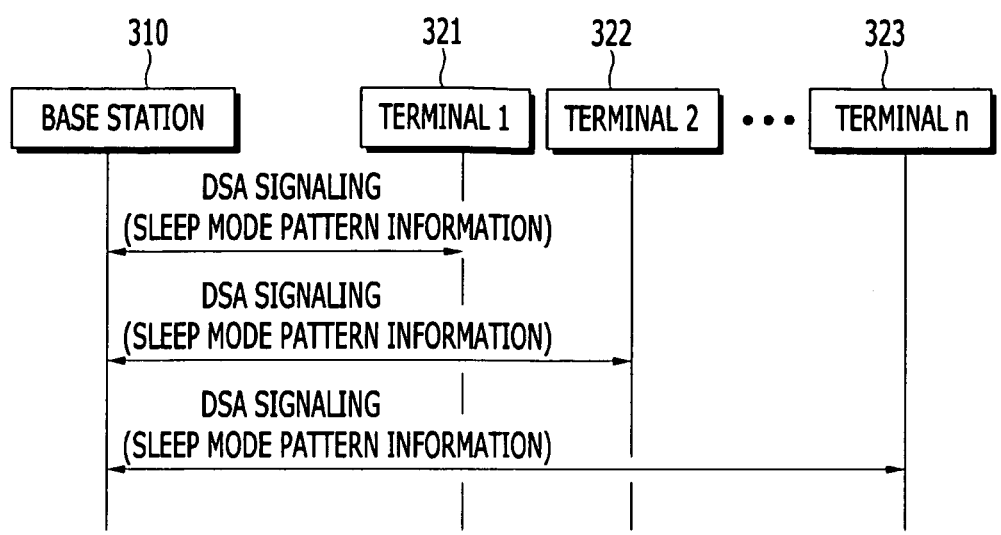
FIG. 3, FIG. 4A, and FIG. 4B each are a signal flowchart showing a method for controlling a power saving mode according to an embodiment of the present invention.
Figure 4A:
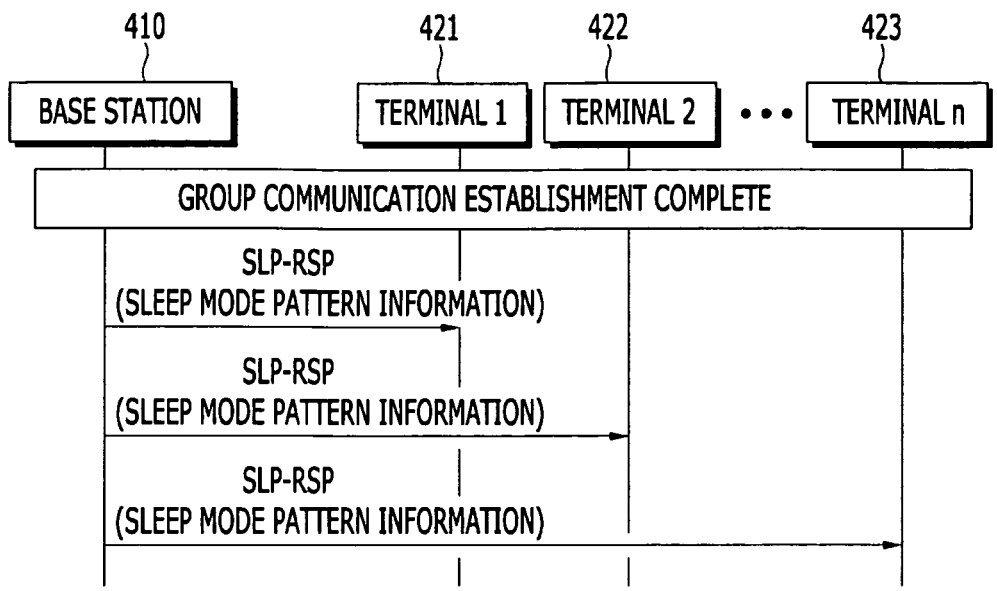
Figure 4B:
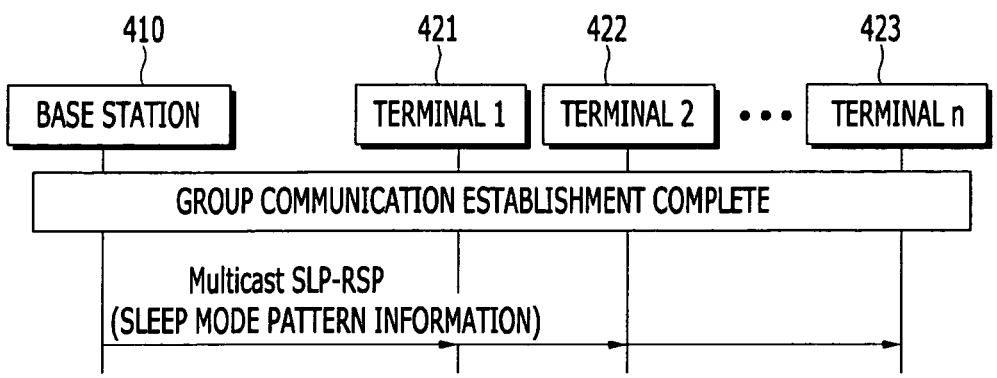

FIG. 3, FIG. 4A, and FIG. 4B each are a signal flowchart showing a method for controlling a power saving mode according to an embodiment of the present invention, and show the case where terminals joining in a group communication operate by a predefined power saving mode pattern.

As shown in FIG. 3, according to an embodiment of the present invention, a sleep mode pattern, i.e., a power saving mode pattern is established in a procedure for establishing a group call connection. A base station 310 and terminals 321, 322, and 323 joining in the group communication establish the sleep mode pattern through the DSA transaction. The sleep mode pattern indicates a power saving cycle, i.e., a sleep cycle in which a sleep window and a listening window are performed, and has a predefined pattern on the terminals 321, 322, and 323. In this case, DSA-REQ, DSA-RSP and DSA-ACK messages used in the DSA transaction include information on the sleep mode pattern.

Referring to FIG. 4A and FIG. 4B, a base station 410 transmits a message including information on the sleep mode pattern to terminals 421, 422, and 423 after the group call connection is established. The base station 410 may newly establish the sleep mode pattern or change the sleep mode pattern that has been established, using the message. The message may be a sleep response (SLP-RSP) message that is a response message of a sleep request (SLP-REQ) message. The SLP-REQ message is transmitted from the terminal 421, 422, or 423 to the base station 410 to request to enter the sleep mode.

As shown in FIG. 4A, the base station 410 may transmit the SLP-RSP message to each terminal 421, 422; or 423 by the unicast. Alternatively, as shown in FIG. 4B, the base station 410 may transmit the SLP-RSP message to the terminals 421, 422, and 423 by the multicast.

According to embodiments shown in FIG. 3, FIG. 4A and FIG. 4B, the message (DSA or SLP-RSP) that is transmitted to the terminals joining in the group communication includes the same predefined sleep mode pattern information on the terminals. As a result, the sleep modes of the terminals within the group can be equally controlled at the same time.

When the predefined sleep mode pattern is used for the group communication, the base station may define an identifier for the sleep mode of the group communication, i.e., a multicast sleep identifier (SLPID), and may allocate the multicast SLPID to a user group of terminals joining in the group communication. The terminals to which the multicast SLPID is allocated receive a traffic indication (TRF-IND) message and check whether the multicast SLPID exists. The TRF-IND message indicates that traffic to be transmitted in a listening window exists. The SLPID may be allocated in the DSA transaction, or may be allocated through the multicast SLP-RSP message or the unicast SLP-RSP message.

Next, an operation of a terminal according to a predefined sleep mode pattern will be described with reference to FIG. 5A to FIG. 5D.

FIG. 5A to FIG. 5D each are a drawing showing a power saving mode operation of a terminal according to an embodiment of the present invention.

Figure 5A:
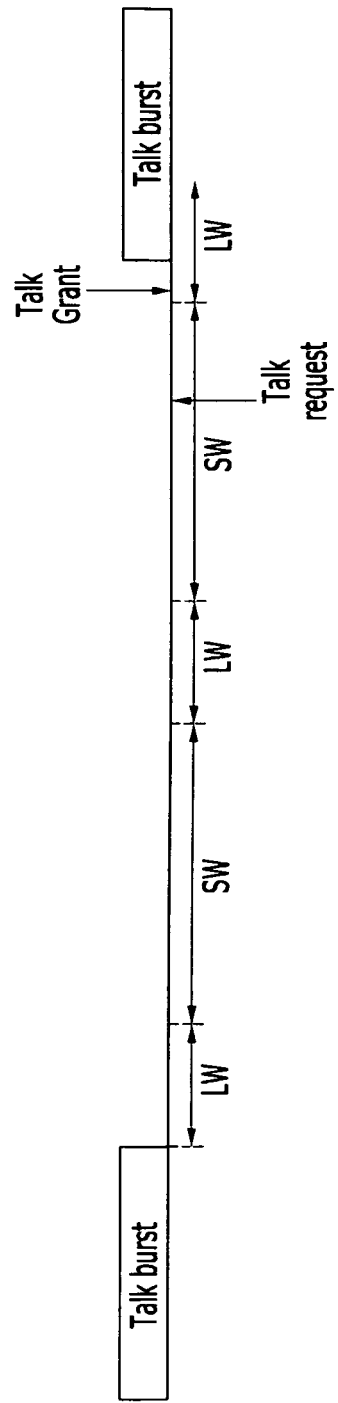
FIG. 5A to FIG. 5D each are a drawing showing a power saving mode operation of a terminal according to an embodiment of the present invention.

Referring to FIG. 5A, in the case that only a group communication service is provided to a terminal joining in a group communication, the terminal enters a sleep mode when no talk burst for a group call exists. The terminal repeats a listening window LW and a sleep window SW in the sleep mode. When receiving in the listening window a talk grant indication according to a talk request of a certain terminal joining in the group communication, the terminal ends the sleep mode and returns to an active mode.

Figure 5B:
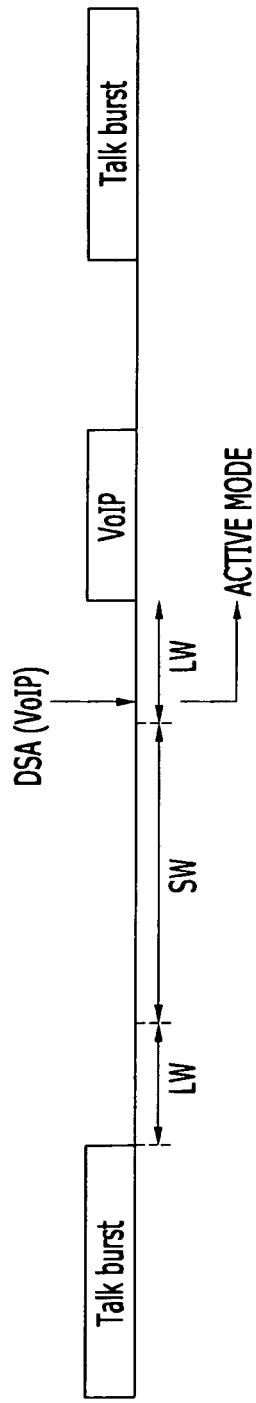

Referring to FIG. 5B, when a terminal joining in a group communication receives a connection establishment request for another service after entering the sleep mode, the terminal ends the sleep mode and returns to an active mode. The connection establishment for another service may be performed through the DSA transaction, and the terminal may receive the connection establishment request in a listening window LW. For example, another service may be a hypertext transfer protocol (HTTP) service, a file transfer protocol (FTP) service, a voice over Internet protocol (VoIP) service, or a video streaming service.

Figure 5C:
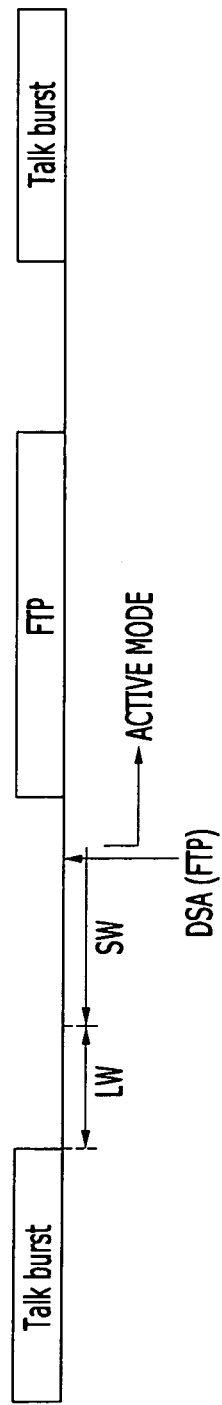

Referring to FIG. 5C, when a terminal joining in a group communication needs a connection establishment for another service after entering a sleep mode, the terminal ends the sleep mode and returns to an active mode. The connection establishment for another service may be performed through the DSA transaction, and the terminal may initiate the connection establishment when returning to the active mode.

Figure 5D:
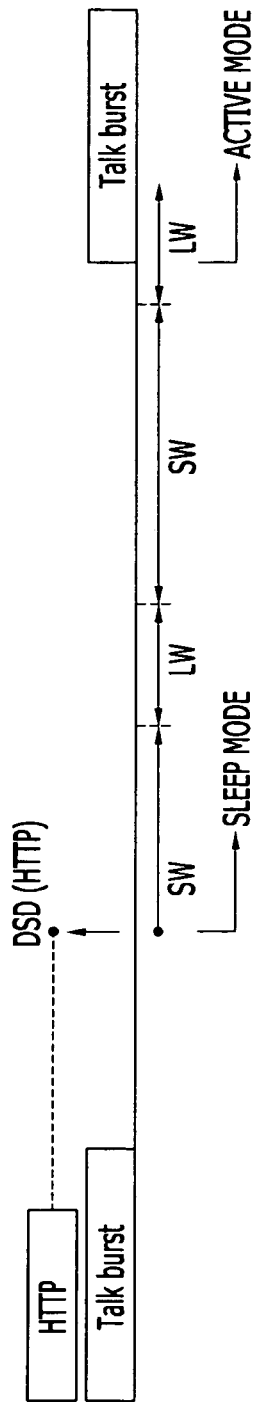

Referring to FIG. 5D, when a terminal joining in a group communication receives other services as well as a group communication service, the terminal does not enter a sleep mode although no traffic burst for a group call exists. The terminal may enter the sleep mode after all connections except for the group communication connection are released. The connection release may be performed through dynamic service delete (DSD) transaction.

As described above, the terminal having only the connection for the group communication can enter the sleep mode after a predetermined time when no traffic burst for the group communication exist, and can transit to the active mode when new traffic burst occurs. When the other traffic connection is established, the terminal can operate the active mode until the other traffic connection is released. The terminal can perform the sleep mode operation according to the predefined sleep mode pattern for the group communication when the other traffic connection is released.

Next, an embodiment that a terminal joining in a group communication controls a sleep mode by unicast will be described with reference to FIG. 6 and FIG. 7.

Figure 6:
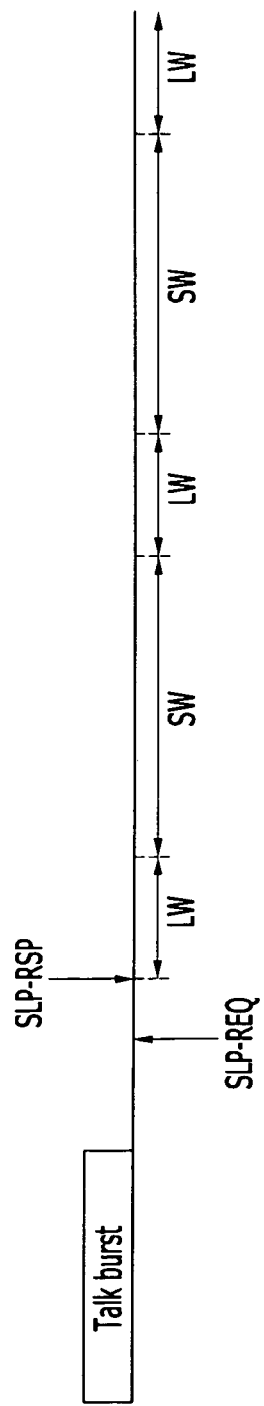
FIG. 6 and FIG. 7 each are a drawing showing a method for controlling a power saving mode by unicast, in a group communication according to an embodiment of the present invention.
Figure 7:
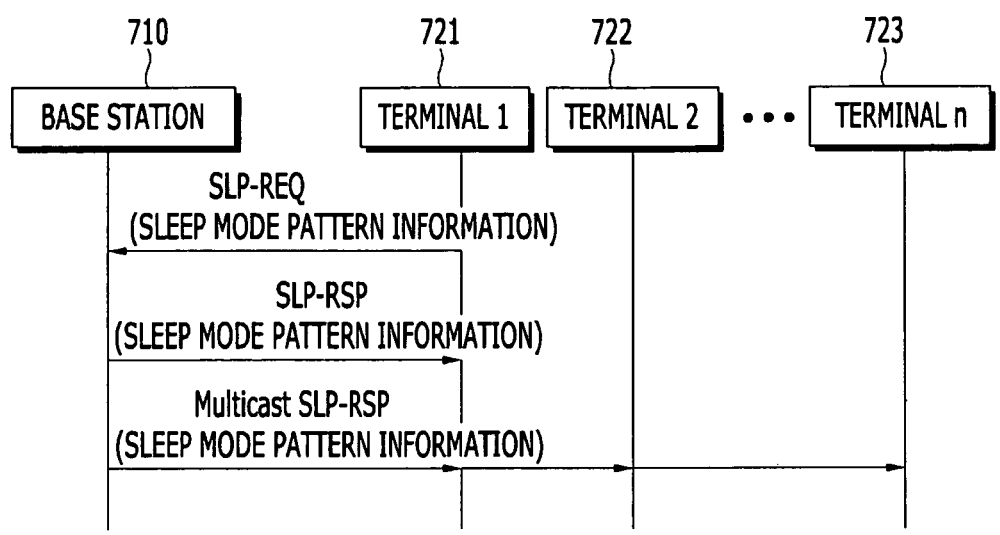

FIG. 6 and FIG. 7 each are a drawing showing a method for controlling a power saving mode by unicast, in a group communication according to an embodiment of the present invention.

Referring to FIG. 6, although a base station applies a predefined sleep mode pattern to all terminals joining in a group communication, a predetermined terminal, for example a terminal in which a strong power save level is required, a terminal having the highest priority, or a specific terminal, may be controlled in a different sleep mode by unicast.

In this case, the terminal transmits a request message for controlling the different sleep mode to the base station, and the base station transmits a response message to the request message to the terminal by the unicast. For example, the request message and the response message may be an SLP-REQ message and an SLP-RSP message, and include information on a sleep mode pattern to be established in the terminal. That terminal operates the sleep mode with the different sleep cycle from the other terminals joining in the group communication, in accordance with the sleep mode pattern established through an exchange of the request message and the response message.

As described above, when the predetermined terminal operates the sleep mode by the unicast, the sleep cycle of the predetermined terminal can be different from the sleep cycle for the group communication. In this case, the base station may notify the other terminals of the group communication of information on a minimum delay that is required for a new call transaction, for example a case that a new user pushes a PTT button to obtain a talking chance in a PTT service. Accordingly, the user cannot think that the user does not obtain the talking chance when the delay for the call transaction is great.

Referring to FIG. 7, a predetermined terminal 721, for example a terminal with a high priority changes a sleep mode pattern for a group communication. The terminal 721 with the high priority transmits a request message including information on a sleep mode pattern to be changed to a base station 710. The base station 710 transmits a response message including information on the changed sleep mode pattern to the terminal 721. Further, the base station transmits a response message including the changed sleep mode pattern to a plurality of terminals 721, 722, and 723 joining in the group communication by multicast. The response message that is transmitted to the terminal 721 with the high priority by the unicast may be omitted. For example, the request message and the response message may be an SLP-REQ message and an SLP-RSP message.

As described above, according to an embodiment of the present invention, the sleep modes of the terminals joining in the group communication can be simply controlled by applying the predefined sleep mode pattern to the terminals. However, when the connections for the other traffics as well as the group communication exist in the terminal, power saving effect may be reduced. Accordingly, an embodiment for compensating this case will be described with reference to FIG. 8.

Figure 8:
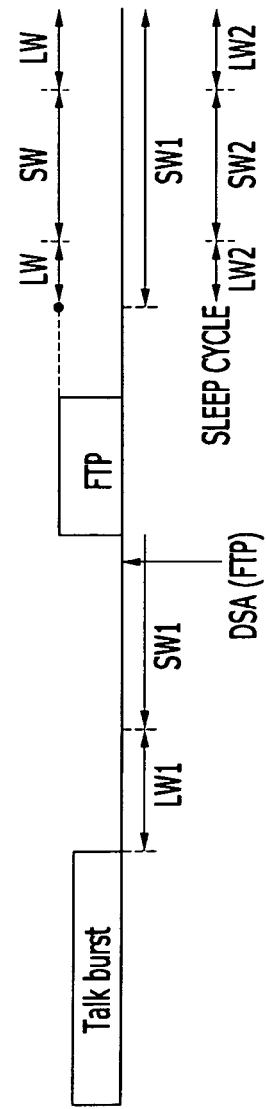
FIG. 8 is a drawing showing a method for controlling a power saving mode according to another embodiment of the present invention.

FIG. 8 is a drawing showing a method for controlling a power saving mode according to another embodiment of the present invention.

Referring to FIG. 8, a terminal sleeps in a common sleep window of a predefined sleep cycle for a group communication and a sleep cycle for a unicast service. For example, after the terminal joining in only the group communication repeats a listening window LW1 and a sleep window SW1 by the termination of the traffic burst for the group communication, a connection for a new service (FTP) may be established in the terminal. When the traffic burst for the new service is terminated, the terminal enters the sleep mode again. A listening window LW2 and a sleep window SW2 according to a sleep mode pattern for the new service are compared with the listening window LW1 and the sleep window SW1 according to the sleep mode pattern for the group communication. A window in which the sleep windows SW1 and SW2 are overlapped becomes a sleep window SW, and the other window becomes a listening window LW. Then, the terminal can efficiently save a power when the other traffic connections as well as the group communication exist.

While the sleep mode has been described as an example of the power saving mode in FIG. 3 to FIG. 8, the method for controlling the power saving mode according to the embodiment of the present invention may be applied to an idle mode that is another example of the power saving mode. The idle mode has a paging listening interval as the listening window, a paging unavailable interval as the sleep window, and a idle pattern as the power saving mode pattern. In the idle mode, the SLP-REQ message and the SLP-RSP message of FIG. 3 to FIG. 8 may correspond to a deregistration request (DREG-REQ) message and a deregistration response (DREG-RSP) message.

As described above, according to an embodiment of the present invention, a power saving mode of a terminal joining in a group communication can be efficiently controlled by a predefined same power saving mode pattern. According to another embodiment of the present invention, a power saving mode of a terminal can be efficiently controlled although other connections as well as a connection for a group communication exists.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling power saving modes of a plurality of terminals joining in a group communication by a base station, the method comprising:
   establishing a group call connection with the plurality of terminals; and
   establishing a same power saving mode pattern for the plurality of terminals;
   receiving a request message for establishing a power saving mode pattern that is different from the same power saving mode pattern, from a predetermined terminal of the plurality of terminals in which the same power saving mode pattern is established; and
   transmitting a response message including information on the different power saving mode pattern to the predetermined terminal, wherein the different power saving mode pattern is applied to the predetermined terminal while the same power saving mode pattern is applied to terminals except the predetermined terminal among the plurality of terminals.

2. The method of claim 1, wherein the power saving mode pattern comprises a power saving cycle having a listening window and a sleep window.

3. The method of claim 1, wherein the power saving mode pattern is established when the group call connection is established.

4. The method of claim 1, wherein establishing the power saving mode pattern comprises transmitting messages including information on the power saving mode pattern to the plurality of terminals by unicast, respectively.

5. The method of claim 1, wherein establishing the power saving mode pattern comprises transmitting a message including information on the power saving mode pattern to the plurality of terminals by multicast.

6. The method of claim 1, further comprising:
   receiving a request message for changing the power saving mode pattern from a predetermined terminal of the plurality of terminals; and
   transmitting a response message including information on a changed power saving mode pattern to the plurality of terminals by multicast.

7. The method of claim 1, further comprising allocating a same identifier to the plurality of terminals, for controlling power saving modes of the plurality of terminals.

8. The method of claim 7, further comprising transmitting a traffic indication message to the plurality of terminals when traffic to be transmitted to the plurality of terminals exists, wherein the traffic indication message comprises the identifier.

9. A method of controlling a power saving mode by a terminal joining in a group communication, the method comprising:
   establishing a group call connection with a base station;
   establishing a same power saving mode pattern as other terminals joining in the group communication; and
   entering a power saving mode according to the power saving mode pattern;
   when the same power saving mode pattern as the other terminals is established in the terminal, transmitting a request message for establishing a power saving mode pattern that is different from the same power saving mode pattern, to the base station; and
   receiving a response message including information on the different power saving mode pattern from the base station, wherein the terminal operates with the different power saving mode pattern in the power saving mode while the other terminals operate with the same power saving mode pattern.

10. The method of claim 9, further comprising entering the power saving mode when other service connection is released and no burst for the group call exists.

11. The method of claim 9, wherein the power saving mode pattern comprises a power saving cycle having a listening window and a sleep window.

12. The method of claim 9, wherein the power saving mode pattern is established when the group call connection is established.

13. The method of claim 9, wherein establishing the power saving mode pattern comprises receiving a messages including information on the power saving mode pattern from the base station.

14. The method of claim 9, further comprising:
   transmitting a request message for changing the power saving mode pattern to the base station; and
   receiving a response message including information on a changed power saving mode pattern from the base station.

15. The method of claim 14, wherein the terminal is a terminal with a highest priority among a plurality of terminals.

16. The method of claim 9, further comprising receiving an identifier from the base station, the identifier being equally allocated to a plurality of terminals for controlling power saving modes of the plurality of terminals.

17. The method of claim 16, further comprising:
receiving a traffic indication message from the base station in a listening window of the power saving mode; and
checking whether the identifier exists in the traffic indication message.

18. The method of claim 9, wherein the power saving mode pattern comprises a power saving cycle having a listening window and a sleep window, and
wherein the method further comprises:
establishing a connection for other service, and
setting a sleep window that is common to the sleep window according to the power saving mode pattern and a sleep window of the other service as a new sleep window when a traffic burst for the other service is terminated.

\* \* \* \* \*